United States Patent [19]

Grafwallner et al.

[11] 3,943,706
[45] Mar. 16, 1976

[54] IGNITION SYSTEM FOR ROCKET ENGINE COMBUSTION CHAMBERS OPERATED BY NON-HYPERGOLIC PROPELLANT COMPONENTS

[75] Inventors: Franz Grafwallner, Holzkirchen; Manfred Schutz, Ottobrunn, both of Germany

[73] Assignee: Messerschmitt-Bölkow-Blohm GmbH, Germany

[22] Filed: Dec. 27, 1973

[21] Appl. No.: 428,840

[30] Foreign Application Priority Data
Jan. 10, 1973 Germany............................ 2300983

[52] U.S. Cl. ...................... 60/204; 60/259; 60/261
[51] Int. Cl.² ..... F23R 1/00; F02K 9/02; F02K 3/10
[58] Field of Search ............. 60/259, 212, 213, 250, 60/39.46, 39.48, 261, 39.82 H, 39.14, 204

[56] References Cited
UNITED STATES PATENTS

| | | | |
|---|---|---|---|
| 862,867 | 8/1907 | Eggleston | 417/395 |
| 2,505,798 | 5/1950 | Skinner | 60/259 |
| 2,858,672 | 11/1958 | Clark | 60/39.48 X |
| 2,906,091 | 9/1959 | Kretschmer | 60/259 X |
| 3,098,353 | 7/1963 | Abild | 60/39.14 X |
| 3,577,735 | 5/1971 | Schmidt | 60/207 |
| 3,828,551 | 8/1974 | Schmidt | 60/204 |

*Primary Examiner*—Carlton R. Croyle
*Assistant Examiner*—Thomas I. Ross
*Attorney, Agent, or Firm*—McGlew and Tuttle

[57] ABSTRACT

An ignition system for rocket engine combustion chambers which are operated by non-hypergolic propellant components and particularly for the precombustion chambers of main stream engines of this type, comprises a main combustion chamber having injector means for injecting a propellant component into the combustion chamber for combustion therein. Since the propellant components employed are non-hypergolically reactive, they are ignited by an ignition agent which is produced by the pressure of a first propellant component which is non-hypergolically reactive with the ignition agent into the combustion chamber. The second propellant component which reacts with the ignition agent hypergolically is also introduced into the combustion chamber so that ignition takes place immediately. The arrangement includes a storage tank for the ignition agent having a piston movable therein by admission of the propellant component which is non-hypergolically reactive with the ignition agent to one side of the storage space which contains the ignition agent which in turn is moved by the piston from the other side of the storage space out through a connecting passage into the combustion chamber. After the piston has travelled an amount sufficient to direct a predetermined quantity of the ignition agent into the combustion chamber, the piston passes a port which communicates the propellant component with the combustion chamber so that it can flow after the ignition agent into the combustion chamber for reaction with the other propellant component which is also introduced into the combustion chamber.

5 Claims, 3 Drawing Figures

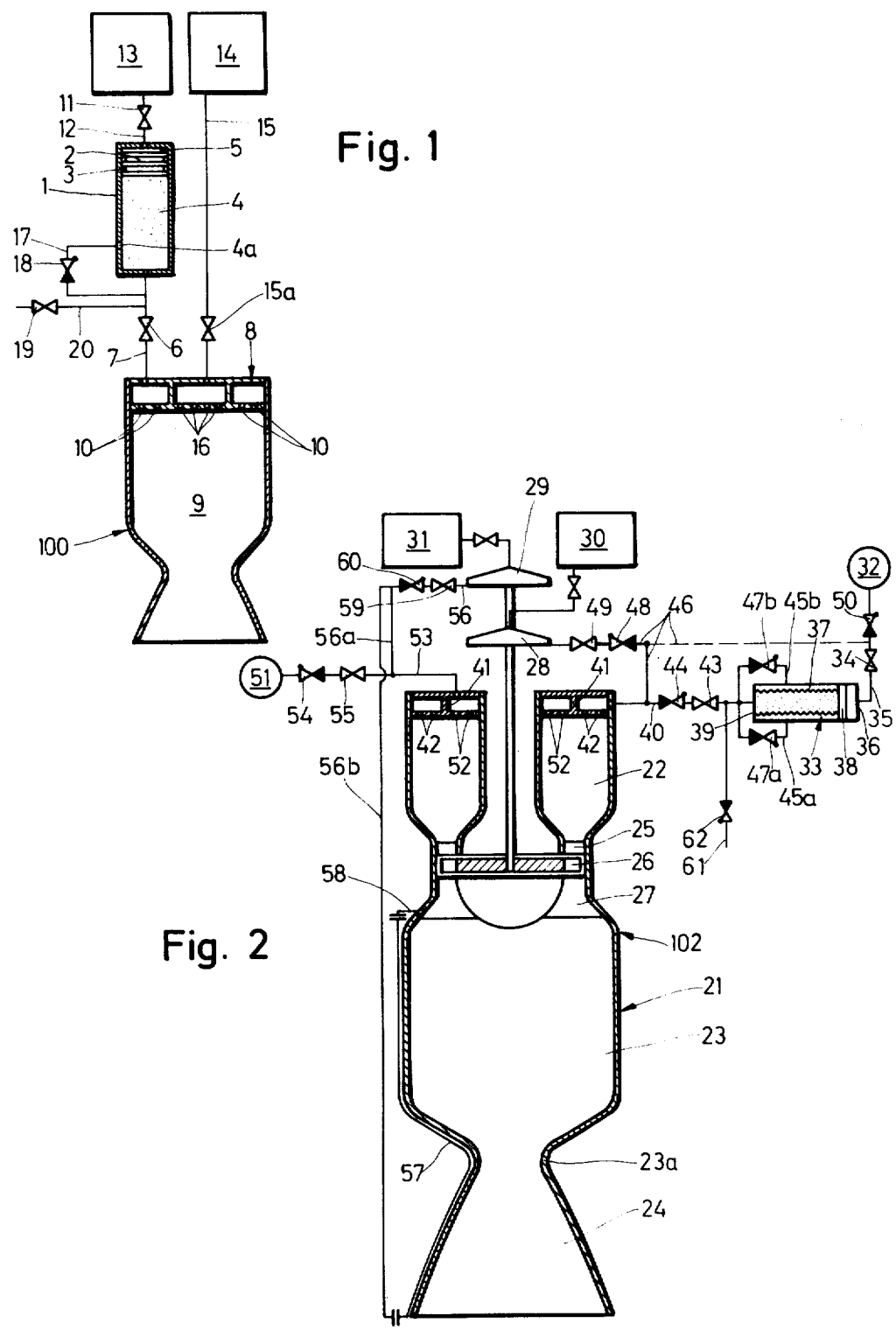

IGNITION SYSTEM FOR ROCKET ENGINE COMBUSTION CHAMBERS OPERATED BY NON-HYPERGOLIC PROPELLANT COMPONENTS

BACKGROUND OF THE INVENTION

1. FIELD OF THE INVENTION

This invention relates in general to the construction of rocket engine combustion chambers and, in particular, to a new and useful rocket engine which operates with non-hypergolic propellant components and to an ignition system therefor.

2. DESCRIPTION OF THE PRIOR ART

In a known ignition system for combustion chambers of rocket engines operated by non-hypergolic propellants, such as liquid hydrogen and liquid oxygen, a liquid, for example, aluminumtriethyl is used as the igniting agent, which is self-reacting with the liquid oxygen. The substantial parts of this ignition system are as follows:

a. an ignition conduit leading into the combustion chamber in the zone of the injection system for both of the propellant components;

b. a two-way reversing valve; and c. a cylinder-piston unit.

The piston of the cylinder-piston unit divides the interior of the cylinder into two spaces. One space is the pressure space for the working fluid or propellant component. If necessary, the working fluid is supplied from the hydrogen storage tank, hydrogen being the propellant component, non-hypergolic with the igniting agent, i.e., the aluminumtriethyl. The other cylinder space is used as a storage space for the igniting agent. In this space, a quantity of aluminumtriethyl is stored which is sufficient for several ignitions, and the space communicates with the ignition conduit through an outlet bore. The outlet bore is controlled by a two-way reversing valve. In its position of normal operation of the combustion chamber, the two-way valve closes the outlet bore for the igniting agent and simultaneously opens a scavenging circuit comprising the ignition conduit. In its position for ignition, the two-way valve opens the outlet bore for the igniting agent and closes the scavenging circuit. A certain portion of hydrogen, i.e., of the propellant component non-hypergolic with aluminumtriethyl and which already serves as the working fluid, is also used as the scavenging fluid.

In the ignition system just described, the piston ensures a spacial separation of the igniting agent (aluminumtriethyl) from the working fluid (hydrogen) which latter is responsible for the injection of the agent into the combustion chamber. The piston thus prevents, with certainty, the mixing of the two substances below the ignition limit. On the other hand, as already mentioned, the aluminumtriethyl is injected into the combustion chamber through a single conduit. However, with such a localization of the ignition focus, a spontaneous initiation of the combustion in the chamber is not always assured and misfiring is not excluded. In addition, in the intermediate time between the ignition phase and full operation of the combustion chamber, i.e., at the end of the ignition phase, both aluminumtriethyl and hydrogen pass into the combustion chamber in the zone of the ignition conduit as a mixture. During the subsequent combustion of this mixture with oxygen, high temperature peaks occur which may result in overheating and damage of the walls of the combustion chamber. To avoid such consequences, efforts are made to minimize the quantity of the igniting agent to be injected. Such a measure, however, requires narrow ignition conduits which may again become a source of ignition troubles because of their susceptibility to carbonization.

For the foregoing reasons, another known ignition system of the mentioned type has dispensed with the storage of a quantity of aluminumtriethyl sufficient for several combustion chamber ignitions and with the supply by portions of this igniting agent from the storage space through a separate conduit into the combustion chamber. Instead, a predetermined quantity of aluminumtriethyl for a single ignition is stored in an appropriately dimensioned storage space and, at the required moment, is transferred into the combustion chamber through the injection bores provided for and by the action of the propellant component which is non-hypergolic with the aluminumtriethyl, for example, hydrogen. A spontaneous initiation of the combustion over the entire cross-sectional area of the chamber is thereby reliably obtained and no additional expenditures of equipment, accessories, or structural adaptation are incurred because of the utilization of the existing equipment for the propellant supply and ignition; that is, the igniting agent (aluminumtriethyl) is driven into the combustion chamber by the propellant component (hydrogen) which is non-hypergolic therewith and which, after the ignition, takes over the full scale operation in the combustion chamber along with the other propellant component (oxygen), in a "seamless" transition. A hollow cylinder is again provided as the storage space for the igniting agent. This space, however, is connected to the propellant supply conduit leading from the hydrogen storage tank to the injection head of the combustion chamber. The aluminumtriethyl is stored in the cylinder between two metallic burst diaphragms. The two burst diaphragms are destroyed as soon as they are exposed to the pressure under which the hydrogen is stored. The diaphragm destruction immediately preceding the transfer of the igniting agent into the combustion chamber is harmless in cases where non-aggressive igniting agents are used, among which the mentioned aluminumtriethyl is numbered. The conditions change completely, however, if fluorine or a similar aggressive fluid distinguished by its spontaneous hypergolic reactivity with hydrogen should be uased as the igniting agent. As is well known, igniting agents of such a kind require a passivation of the metals with which they come into contact. Without passivation, destruction of the burst diaphragms would have serious consequence because a sudden inflammation of the rupture areas would follow. Still another risk is involved in the destruction of the diaphragms, namely, the possibility of a subsequent mixing of the igniting agent and the pushing propellant component in a proportion below the ignition limit. This risk is particularly great in cases where the densities of the igniting agent and of the propellant component transferring it into the combustion chamber of the rocket are equal to each other or only slightly different.

SUMMARY OF THE INVENTION

The invention is directed to the development of a simple ignition system of the type described hereinbefore which would unite the advantages but avoid the drawbacks of the prior art and would at all times be reliable in operation regardless of whether aggressive or non-aggressive igniting agents are used or whether the densities of the igniting agent and the propellant component differ considerably, slightly, or not at all.

In accordance with the invention, there is provided, a system in which a gaseous igniting agent is stored in a storage space under a low pressure, relative to the required transfer pressure. The outlet conduit for the igniting agent which leads from the storage space to the injection mechanism is common to the igniting agent and to a first propellant component which is non-hypergolic therewith. The inlet conduit for the first propellant is regulated by valve means in which the first propellant component is supplied into the storage space, while the valve in the outlet conduit for the igniting agent is closed. The first propellant component acts on one side of a piston in the storage space and compresses the igniting agent, and after the outlet valve is opened on the igniting agent side, causes the transfer of the agent into the combustion chamber. As soon as the igniting agent is evacuated from the storage space, the first propellant component leaves the storage space through at least one bypass conduit which, at this moment, is cleared and opened by the advance of the pressure-tight piston, so that the first propellant component is directed into the outlet conduit for the igniting agent upstream of the valve.

In the inventive ignition system, the fact that the igniting agent passes into the combustion chamber through the injection bores which, during the subsequent full operation of the combustion chamber, will be flowed through by the propellant component having compressed and pushed the agent in, assures a spontaneous ignition in the chamber at any time. Equally ensured is also a "seamless" transition from the ignition phase to the full combustion process in the chamber. In fact, the propellant component non-hypergolic with the igniting agent enters the combustion chamber immediately after the agent through the very same injection bores. It is further important, for the reliability in service, that the propellant component non-hypergolic with the igniting agent, a. cannot pass into the combustion chamber before the ignition, and b. cannot mix with the igniting agent below the ignition limit, either during the compression in the storage space or during the transfer of the igniting agent into the combustion chamber.

This is made sure by the pressure-tight piston in the storage space for the igniting agent and by the bypass conduit which is controlled by the piston. In addition, the provided association of the bypass for the propellant with the outlet conduit for the igniting agent insures a scavenging of the passage by the propellant subsequently flowing therethrough.

Because of the scavenging of the outlet conduit and the complete evacuation of the storage space for the igniting agent in the course of a single ignition operation, and of the absence of burst diaphragms in the storage space, the inventive ignition system is additionally excellently suited for aggressive gaseous igniting agents. The complete evacuation of the storage space during a single ignition, and the subsequent scavenging of the outlet conduit for the igniting agent are measures which make a particular passivation of the parts exposed to an aggressive agent superfluous. Moreover, the absence of the burst diaphragms eliminates the risk of inflammation of fresh areas of rupture with which the aggressive agent would come into contact. It is well known that one of the aggressive gaseous agents is fluorine; a very interesting igniting agent for rocket engines which is driven, for example, by liquid hydrogen and liquid oxygen, because of its spontaneous self-igniting reaction with hydrogen. The fact that in rocket engines of the type in question, fluorine pressures of 60 atm. above atmospheric pressure and more are necessary for combustion chamber ignitions and, in contrast thereto, security regulations concerning fluorine do not permit storage pressures exceeding 28 atm. above atmospheric pressurre, produces no problem for the inventive ignition system. That is, because the gaseous igniting agent is stored in the respective space under low pressure and is compressed there, immediately before the ignition in the combustion chamber, to the required transfer pressure, all of the requirements of operation and security are met, unlike any other system.

According to a development of the invention, the gaseous igniting agent in the storage space is enclosed in a discharge bellows which is hermetically fixed to both the pressure-tight piston and, on the other side, to the portion of the storage space where the outlet conduit for the igniting agent is connected. In addition, a check valve is mounted in the bypass conduit for the propellant. The provision of the discharge bellows is recommended primarily in cases where a position-independent transfer of the igniting agent into the combustion chamber is appreciated. Aside therefrom, the discharge bellows in the storage space for the igniting agent, together with the check valve in the bypass conduit for the propellant, securely prevent a mixture of the igniting agent with leakage quantities of the propellant passing around the piston during the compression.

As is known, in liquid-propellent rocket engines of the so-called main stream type, gas, rich in oxidizer or fuel, is produced in a precombustion chamber. This gas is further reacted in a main combustion chamber with additional fuel or oxidizer. Prior to that, on its way from the precombustion chamber into the main combustion chamber, the gas is expanded in a turbine. The turbine drives two pumps which ensure the supply of propellants into the precombustion and main combustion chambers. In case an engine of this type is designed, for example, for liquid hydrogen and liquid oxygen, the ignition, as well as the start of the turbine, is particularly simple if, in accordance with a further development of the invention, an igniting agent, such as fluorine, is used, and the inlet conduit for the propellant leading into the storage space for the igniting agent is connected to a pressure tank filled with gaseous oxygen.

The gaseous oxygen from this pressure tank serves not only for the compression and transfer of the fluorine into the precombustion chamber, but it also furnishes the power necessary for the start of the turbine following the ignition, a circumstance which is manifested by an advantageous particularly low fluorine consumption. As soon as the turbine, which has been started in the required manner, has sufficiently accelerated the pumps coupled thereto, the operation of the precombustion chamber is changed insofar as supply of liquid oxygen is substituted for the gaseous oxygen. This change can be effected in a particularly easy manner if, according to a further feature of the invention, the pressure conduit of the oxygen pump, in which a valve and a check valve are mounted one after the other in the flow direction, a. leads into the outlet conduit of the igniting agent, upstream of the valve mounted therein and of a check valve following the same in the flow direction, or b. leads into the propellant conduit connecting the pressure tank for gaseous oxygen to the storage space for the igniting agent, between the valve mounted therein and a check valve provided upstream thereof.

The mentioned pressure tank for gaseous oxygen becomes superfluous if the starting power for the turbine driving the pumps is produced in another way, for example, by cool gas admission. In such a case, for example, gaseous hydrogen is a suitable working fluid. The starting of the turbine in the last-mentioned manner not only has the advantage of less expensive equipment, but also permits the connection of the inlet conduit for the propellant leading into the storage space for the igniting agent to the pressure conduit of the pump delivering the liquid oxygen. Thus, the liquid oxygen furnished actuates the piston in the storage space for the igniting agent and the advantages resulting therefrom is that the fluorine injection into the precombustion chamber is proportional to the performance of the oxygen pump.

Accordingly, it is an object of the invention to provide a rocket engine combustion chamber or an ignition system therefor, which provides a means for directing an emission agent into the combustion chamber for ignition with a hypergolically reacting propellant component while utilizing the storage pressure of a second propellant component which is non-hypergolically reactive with the other component to drive a piston to force the ignition agent into the combustion chamber and which is therefore admitted itself by the movement of the piston through a passage which is uncovered by the piston into the combustion chamber following the ignition agent.

A further object of the invention is to provide an apparatus for directing an ignition agent, such as fluorine or similar aggressive agent, into a combustion chamber without requiring that the fluorine be stored at a high pressure which comprises utilizing the prestorage pressure of a propellant component, such as hydrogen, to drive a piston having a bellows filled with the ignition agent and separating it from the metallic wall thereof through a passageway leading to the combustion chamber ignition and wherein the propellant component is used to scavenge the passage of the igniting agent by flow through the same passage after the igniting agent.

A further object of the invention is to provide a rocket engine combustion chamber of the main current type which includes an arrangement for utilizing the pressure of a stored propellant component to drive an igniting agent into a precombustion chamber and to thereafter use the same propellant component to scavenge the igniting agent flow passage to the combustion chamber.

A further object of the invention is to provide an ignition system and a rocket engine combustion chamber which is simple in design, rugged in construction and economical to manufacture.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a schematic partial sectional view of a rocket engine combustion chamber and propellant component supply system with ignition means constructed in accordance with the invention;

FIG. 2 is a view similar to FIG. 1 of another emobodiment of the invention; and

GENERAL DESCRIPTION OF PREFERRED EMBODIMENTS

Figure 3:
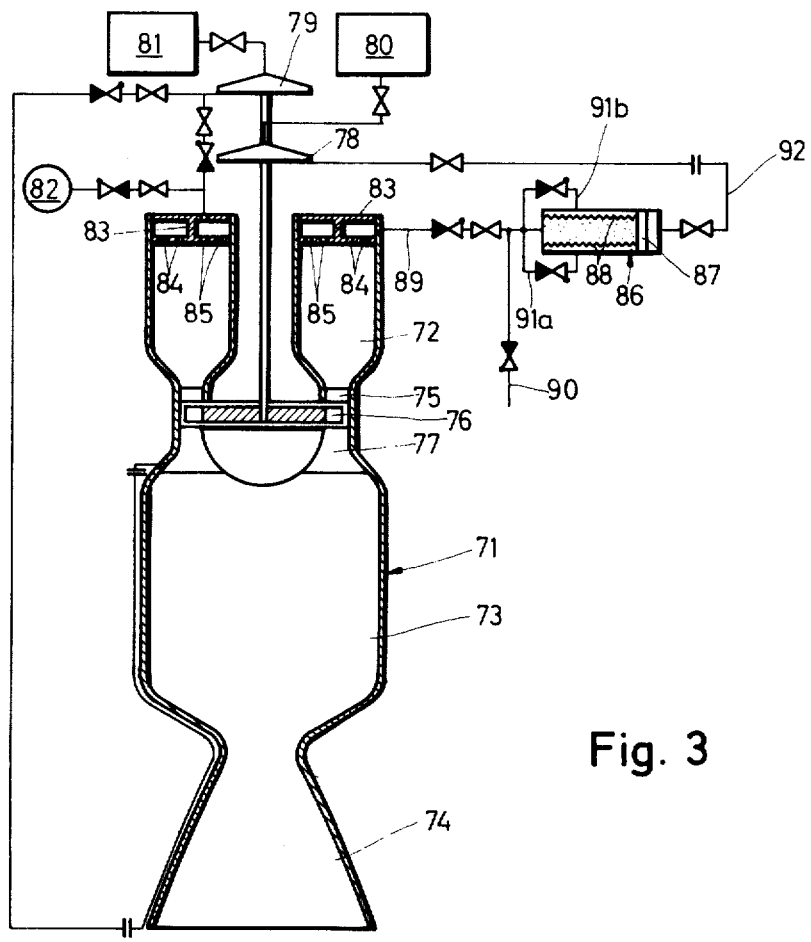
FIG. 3 is a view similar to FIG. 1 of still another embodiment of the invention.

Referring to the drawings in particular, the invention embodied therein in FIG. 1, comprises an ignition system for a rocket engine, generally designated 100, which is operated with non-hypergolically reactive propellant components, the first one of which is stored in a pressurized container 13 under a pressure, and a second one of which is stored in a tank or storage space 14.

In accordance with the invention, rocket engine 100 is started or ignited by the use of an igniting agent 4, which is stored in a storage space or hollow cylinder 1, having a piston 2 which is movable therein which includes a labyrinth packing 3 to provide a tight seal with respect to respective opposite sides thereof. Piston 2 divides the hollow cylinder into a space for the ignition agent 4 and a space on the opposite side 5 to accommodate the first propellant component 13 which is admitted through valve 11 and passage 12 when the engine is to be started. A gaseous igniting agent, for example, gaseous fluorine, in a quantity provided for a single ignition in combustion chamber 9 is contained in storage space 4 under relatively low pressure, for example at 28 atm. above atmospheric pressure.

An outlet conduit 7 extends from the far end of storage space 4 to an ignition head 8 of combustion chamber 9 which has a plurality of discharge nozzles 10 for discharging the ignition agent into combustion chamber 9. Flow through conduit 7 is regulated by a valve 6.

In accordance with the invention, when the ignition agent 4 is directed into head 8 for discharge through nozzle openings 10 into combustion chamber 9, the second propellant component contained in storage space 14, under pressure, is fed through conduit 15 under the control of valve 15a to a central portion of the head for discharge through openings or nozzles 16. The first propellant component in storage tank 13 is, for example, a component which is non-hypergolic with fluorine, and this may be liquid oxygen, for example. When valve 11 is opened, the first component flows through conduit 12 into space 5 to cause movement of piston 2 to compress the ignition agent in space 4 until valve 6 is open in which time the ignition agent flows through conduit 7 into injection head 8. During this time, valve 15a is open so that the second propellant component, which is hypergolic with the fluorine or the ignition agent, and which may for example be a liquid hydrogen, is directed into the central portion of injector head 8 for discharge through opening 16. At the moment that valve 11 in conduit 12 is opened, the liquid oxygen or first propellant component passes from storage tank 13, in which it is stored under pressure, into working space 5 of cylinder 1. During an initial portion of this time, valve 6 in the outlet conduit 7 is closed so that the liquid oxygen causes the movement of the piston 2 and the compression of the fluorine to a pressure up to the required transfer pressure. As the transfer pressure is reached, the ignition operation proper begins by the opening of valve 6 in conduit 7 to permit passage of the ignition agent through conduit 7 and into combustion chamber 9. Under the constant pressure of the first propellant component, liquid oxygen, the compressed fluorine is pushed from storage space 4 through conduit 7 and injector manifold 10 into combustion chamber 9 where it hypergolically reacts with the hydrogen which has been simultaneously supplied through conduit 15 into the injector manifold 16. As soon as storage space 4 for the igniting agent is evacuated completely, piston 2 moves beyond a port 4a so that the first propellant component may move though this port through a connecting passage or bypass 17. A check valve 18 in bypass conduit 17 permits flow to conduit 7 and into injector head 8. Bypass 17 connects upstream of valve 6 so that the flow of the oxygen or first propellant component assures a scavenging of the conduit from the fluorine and a "seamless" transition from the ignition phase using fluorine and hydrogen to the full operation phase of operation of the combustion chamber with oxygen and hydrogen. A filling conduit 20 is provided downstream of the bypass connection to discharge conduit 7, but upstream of the valve 6, and this carries valve 19 which may be opened to conduct the ignition agent through the filling conduit 20 and a portion of conduit 7 into storage space 4 when valves 6 and 11 are closed.

In the embodiment of the invention shown in FIG. 2, there is provided a rocket engine of the main stream type, generally designated 102, which includes a tubular portion, generally designated 21, defining a main combustion chamber 23 having a nozzle neck portion 23a and a divergent thrust nozzle discharge portion 24. Rocket engine 21 is intended for a liquid propellant, and it is one of the main stream type, and it comprises:

a. a precombustion chamber 22 in which during full operation of the chamber, a gas mixture which is either rich in oxidizer or fuel is produced;

b. a main combustion chamber 23 in which a further reaction of the gas mixture rich oxidizer or the fuel is reacted with additional fuel or oxidizer as the case may be;

c. a turbine 26 located between front guide vanes 25 at the discharge of precombustion chamber 22 and the back guide vanes 27 at the entrance to main combustion chamber 23 in which the gas mixture which is rich in either oxidizer or fuel is expanded on its way from the precombustion chamber to the main combustion chamber; and d. two pumps 28, 29 which are driven by turbine 26 and serve to supply the propellents, for example liquid oxygen, from a storage tank 30 and hydrogen from a storage tank 31 into precombustion chamber 22 and main combustion chamber 23.

In this example, the ignition system also comprises a tank 32 filled with gaseous oxygen under high pressure and a cylindrical storage space 33 for the igniting agent. A conduit 35, which can be closed by a valve 34, leads from the gas tank 32 to storage space 33 for the igniting agent and terminates in a passage through end wall 36 of the cylinder. A predetermined quantity of gaseous igniting agent provided for a single ignition in the combustion chamber 22, for example fluorine, is stored in a space 33 under a relatively low pressure which is enclosed in a discharge bellows 37. Discharge bellows 37 is hermetically fixed to the pressuretight piston 38 with which storage cylinder 33 is fitted and, on the other side, to the other end wall 39 of storage cylinder 33. An outlet conduit 40 for the igniting agent leads from a bore in the last-mentioned end wall 39 to injection head 41 of precombustion chamber 22, namely, to the injection bores 42 through which, during the full operation, liquid oxygen is supplied. Adjacent the storage space 33, a valve 43 and a check valve 44 following the same in the flow direction are provided in the outlet conduit 40 for the igniting agent. Two bypass conduits 45a, 45b, lead into conduit 40, upstream of valve 43, and the pressure conduit 46 of oxygen pump 28 leads into conduit 40 downstream of check valve 44. The gaseous oxygen leaves the storage space 33 for the igniting agent through a bore in the side of cylinder 33 which is uncovered by piston 38 and flows through bypass conduits 45a, 45b, as soon as the fluorine is completely evacuated from discharge bellows 37. A check valve 47a, 47b, respectively, is mounted in each of the bypass conduits 45a, 45b. A check valve 48 is also provided in pressure conduit 46 of oxygen pump 28 in which, in addition, a valve 49 is mounted upstream of check valve 48.

In a variant of this example, instead of leading into the outlet conduit 40 for the igniting agent, pressure conduit 46 of oxygen pump 28 may be connected to inlet conduit 35 for the propellant, that is, as indicated by a dashed line, between valve 34 and a check valve 50 which is mounted upstream thereof. In such a case, the check valve 44 in outlet conduit 40 for the igniting agent becomes superfluous.

As soon as valve 34 in conduit 35 is opened, the gaseous oxygen passes into storage space 33 for the igniting agent. There, while the valve 43 in outlet conduit 40 for the igniting agent is closed, the oxygen compresses the fluorine from the low storage pressure to the required transfer pressure. Thereupon, outlet conduit 40 is opened and, under a constant pressure of the oxygen, the compresses fluorine is pushed through outlet conduit 40 and injection bores 42 communicating therewith into precombustion chamber 22. In precombustion chamber 22, the fluorine spontaneously reacts with the gaseous hydrogen simultaneously supplied from a pressure tank 51. The gaseous hydrogen is supplied through injection bores 52 of injection head 41 through which, in full operation, the liquid hydrogen will be supplied. Conduit 53 leads from the hydrogen pressure tank 51 to the injection bores 52 and is provided with a check valve 54 and a valve 55 mounted downstream of the same. A branch 56a of the pressure conduit 56 of hydrogen pump 29 leads, downstream of valve 55, into conduit 53. Another branch 56b of pressure conduit 56 is connected, at the rear end of the thrust nozzle, to colling ducts 57 which extend through the walls of thrust nozzle 24 and of main combustion chamber 23 toward the front end of the latter where a duct 58 is connected thereto leading to the back guide vanes. Upstream of the two branches 56a, 56b, a valve 59 and a check valve 60 are mounted one after the other in pressure conduit 56.

Filling of the discharge bellows with fluorine is effected through a conduit 61 which is provided with a check valve 62 and leads into outlet conduit 40 for the igniting agent, upstream of valve 43. The quantity of the gaseous fluorine is preset so as to only start the ignition in the precombustion chamber 22. The starting power for turbine 26, on the contrary, is produced by the reaction between the gaseous oxygen and hydrogen. As has already been mentioned, at the moment the evacuation of the storage space 33 is terminated, the gaseous oxygen passes through bypass conduits 45a, 45b, cleared by piston 38, into outlet conduit 40 and, therefrom, to the injection bores 42. Once a sufficient acceleration has been imparted to propellant pumps 28, 29 by turbine 26, which has been started in the described manner, a supply of liquid oxygen and liquid hydrogen is substituted for the supply of gaseous oxygen and hydrogen.

FIG. 3 also shows a rocket engine of the main stream type 71 designed, for example, for operation with liquid oxygen and liquid hydrogen. The engine comprises a precombustion chamber 72, a main combustion chamber 73, a thrust nozzle 74, a turbine 76, front guide vanes 75 and back guide vanes 77. Associated therewith are an oxygen pump 78, a hydrogen pump 79, a tank for liquid oxygen 80 and a tank for liquid hydrogen 81. Propellant pumps 78 and 79 are driven by turbine 76. A tank 82 filled with gaseous hydrogen under high pressure is provided for the starting of the turbine.

After turbine 76 has been started by admission of gaseous hydrogen from tank 82, the precombustion chamber 72 is ignited. The injection head in the precombustion chamber comprises mutually separated injection manifolds 84 and 85. The manifold 85 is provided for the injection of hydrogen into precombustion chamber 72. Through manifold 84, first the igniting agent and thereupon the liquid oxygen, passes into the precombustion chamber 72. For example, gaseous fluorine is again used as the igniting agent. It is stored in a storage cylinder 86. As to the pressure-tight piston 87 and a discharge bellows 88 fixed thereto in cylinder 86, the arrangement is analogous to that described in connection with FIG. 2. The same applies to the disposition of the inlet and outlet conduits 92 and 89, respectively, for the igniting agent, and bypass conduits 91a, 91b for the propellant, all associated with storage cylinder 86. However, the inlet conduit 92 for the propellant leading into storage cylinder 86 at the side of pressure-tight piston 87 opposite to the bellows, does not communicate with a pressure tank containing oxygen, as in the case of FIG. 2. This conduit 92 is directly connected to the pressure conduit of oxygen pump 78. Consequently, after the turbine has been started, piston 87 in storage cylinder 86 is actuated by the liquid oxygen furnished by pump 78. This results in the advantage that gaseous fluorine contained in discharge bellows 88 in a quantity sufficient for a single ignition in precombustion chamber 72 is injected into the latter in proportion with the produced power and reacts therein with the hypergolic hydrogen which is separately supplied at the same time. The "seamless" transition from the ignition phase to the full operation with liquid oxygen and liquid hydrogen is assured, as in the embodiment according to FIG. 2, by the bypass conduits 91a, 91b which are cleared by piston 87 as soon as discharge bellows 88 is evacuated.

While specific embodiments of the invention have been shown and described in detail to illustrate the application of the principles of the invention, it will be understood that the invention may be embodied otherwise without departing from such principles.

What is claimed is:

1. An ignition system for rocket engine combustion chambers operated by non-hypergolic propellant components, and particularly for precombustion chambers of main stream engines, comprising wall means defining a main combustion chamber having a thrust nozzle discharge and a precombustion chamber connected to said main combustion chamber, said precombustion chamber generating gases having one propellant component in excess of the other, a gas turbine in the connection between said main and said precombustion chambers operable by the gases perfused by said precombustion chamber and discharging these gases after use into said main combustion chamber, first and second propellant component pumps connected to and driven by said turbine, storage means for an igniting agent for storing said igniting agent in a gaseous state under a pressure which is lower relative to a pressure required to transport the igniting agent to said precombustion chamber, a first propellant component supply tank for storing a first propellant component which is non-hypergolically reactive with said igniting agent and which is connected to said first propellant component pump, a second propellant component supply tank for storing a second propellant component which is hypergolically reactive with said igniting agent but not with said first propellant component and which is connected to said second propellant component pump, respective first and second delivery conduits connected between said first and second propellant component pumps and said precombustion chamber for the flow of said components to said precombustion chamber, piston means movable in said storage means and dividing said storage means into an ignition agent space on one side of said piston means and a pressurizing gas-receiving space on the other side of said piston means, first and second storage tanks for separately storing second and first gaseous non-hypergolic propellant components under high pressure connected respectively to said precombustion chamber and to said pressurizing gas-receiving space for forcing said piston to move in a direction to compress the igniting agent and to subsequently direct it through said first delivery conduit to said precombustion chamber, said storage space means having a port uncoverable by substantially complete movement of said piston to evacuate said ignition agent and to communicate the space containing said first gaseous propellant component with said first delivery conduit for its flow through said first delivery conduit after the flow of the ignition agent, said first storage tank connection to said pressurizing gas-receiving space having valve means operable only upon starting of said engine to pressurize said pressurizing gas-receiving space.

2. An ignition system for rocket engine combustion chambers, according to claim 1, wherein said storage means comprises a cylinder having an outlet in said first conduit and having a collapsible bellows in said cylinder with an interior space containing said igniting agent communicating with the outlet of said storage space means and to said precombustion chamber, said bellows being spaced inwardly from said cylinder walls and defining an annular space around said bellows which is sealed off from the interior of said bellows which communicates with said outlet.

3. An ignition system for rocket engine combustion chambers, according to claim 2, including a bypass line connected from said storage means port to said first conduit having a check valve therein permitting flow only from said storage space means to said outlet.

4. A method of igniting a rocket engine of the main stream type which includes a main combustion chamber and a precombustion chamber which generates one propellant component-rich gaseous products which drive a turbine in the connection between the precombustion chamber and the main combustion chamber and in which the turbine, in turn, dirves first and second propellant component pumps which are connected respectively to propellant components which are separately pumped to the precombustion chamber and to the main combustion chamber and using an igniting agent which is stored in a separate storage vessel having a sealed piston member which is movable in the vessel to discharge the igniting agent and also using first and second storage tanks of high pressure, gaseous non-hypergolic propellant components and wherein the igniting agent is hypergolically reactive with only one of said first and second components and the high pressure gaseous components in the storage tanks are non-hypergolic, comprising upon starting of the engine connecting the second storage tank through the storage vessel for the igniting agent at a location behind the piston to move the piston to pressurize the igniting agent and to force it to said precombustion chamber while the piston maintains a separation of the second storage tank high pressure gas from the igniting agent during its flow into said precombustion chamber and after the igniting agent has flown out of its storage vessel directing the high pressure gaseous propellant component from said first storage tank into said precombustion chamber to effect ignition thereof hypergolically with said igniting agent and subsequently adding said first and second propellant components to said precombustion chambers by delivery thereof by the pumps driven by said turbines to complete the combustion operation.

5. A method of igniting a rocket engine combustion chamber, according to claim 4, wherein the space in the storage space containing the igniting means is divided by a collapsible bellows and the igniting agent is maintained in the collapsible bellows which is compressed by movement of the piston so that it does not come into contact with the walls of the storage space.

\* \* \* \* \*